(12) United States Patent
Sayed et al.

(10) Patent No.: US 8,433,733 B2
(45) Date of Patent: Apr. 30, 2013

(54) WEB APPLICATION RECORD-REPLAY SYSTEM AND METHOD

(75) Inventors: Imran Q. Sayed, Mountain View, CA (US); Benjamin Trevor Kolin, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 125 days.

(21) Appl. No.: 12/686,927

(22) Filed: Jan. 13, 2010

(65) Prior Publication Data

US 2011/0173239 A1    Jul. 14, 2011

(51) Int. Cl.
*G06F 17/30* (2006.01)
(52) U.S. Cl.
USPC .............. 707/821; 707/658; 715/704
(58) Field of Classification Search .......... None
See application file for complete search history.

(56) References Cited

U.S. PATENT DOCUMENTS

| 6,832,367 | B1 * | 12/2004 | Choi et al. ............. 717/130 |
| 2006/0047496 | A1 * | 3/2006 | Genkin et al. ............. 703/22 |
| 2010/0005464 | A1 * | 1/2010 | Malyugin et al. ............. 718/1 |
| 2010/0095208 | A1 * | 4/2010 | White et al. ............. 715/704 |

\* cited by examiner

*Primary Examiner* — Anteneh Girma (57) ABSTRACT

A web application includes a record-replay library component to record sessions into a log file and subsequently replay the recorded session based upon the log file. The record-replay library interacts with the runtime environment of the web application to intercept events that correspond to data inputs received by the web application, such as user inputs, remote server inputs and inputs from the computer system on which the runtime environment is executing. On replay, the log file is read by the record-replay library and events are programmatically dispatched to the runtime environment by the record-replay library based on the log entries in order to simulate the various data input events that occurred during the recorded session.

20 Claims, 5 Drawing Sheets

FIGURE 5 and attach an event handler to the object to receive events generated for the object. As such, if such an object subsequently receives input data, the record-replay library component receives notification of an event generated for the object that corresponds to receipt of input data by the web application and the event handler can generate a log entry for the event and transmit the log entry to a log file for storage.

WEB APPLICATION RECORD-REPLAY SYSTEM AND METHOD

BACKGROUND

The advancement of runtime environments that are embedded in web browsers, such as Java, JavaScript and Flash has given rise to an increase in the development of rich Internet or web applications. Many such web applications are client applications that are remotely downloaded through the web browser and executed in an embedded runtime environment that is installed into the web browser. These web applications often interact with remote servers to provide users with sophisticated user interfaces and access to media and content available across the Internet.

Troubleshooting and debugging web applications can be difficult due to the interactions that the web applications have with remote servers. Bugs discovered and reported during quality assurance testing are often difficult to replicate by a developer assigned to resolve such reported bugs due to the dependencies of interacting with such remote servers and the complexities of the installed runtime environments. Due to such difficulties, web application developers typically insert log statements into the source code of the web application to record the state of the runtime environment during executed sessions to assist in troubleshooting. However, whether the resulting generated log files provide sufficient information about a particular reported bug is highly dependent upon where such log statements have been inserted within the source code and the level of detail provided in such log statements.

SUMMARY

One or more embodiments of the present invention provide methods for recording a web application session into a log file and subsequently replaying the recorded web session based upon the log file. Such methods, for example, enable web sessions occurring during quality assurance testing to be recorded and subsequently replayed to analyze reported issues. Such a record-replay capability enables the various inputs (e.g., user, server, system, etc) into the web application that occurred during a particular session to be replayed in the future (based on the log file) in order to reproduce a possible bug (and thereafter, explore a possible solution for the bug). In one such embodiment, a web application includes a record-replay module or library component that interacts with the runtime environment to intercept events that correspond to data inputs received by the web application, such as user inputs, remote server inputs and inputs from the computer system (e.g., timer and alarm events, etc.) on which the runtime environment is executing. On replay, the log file is read by the record-replay module and events are dispatched to the runtime environment by the record-replay module based on the log entries in order to simulate the various data input events that occurred during the recorded session.

One such method may be performed by a record-replay library component of a web application to record a session of the web application running within a runtime environment. The record-replay library component first receives notification of events dispatched through the runtime environment, for example, by registering to listen for events from the runtime environment during an initialization process of the web application. By receiving such notification, the record-replay library component is able to identify a dispatched event corresponding to a creation of an object capable of receiving input data transmitted to the web application during runtime Another method may be performed by a record-replay library component of a web application to replay a recorded session of a web application running within a runtime environment. The record-replay library component first loads a log file comprising a sequence of log entries, wherein each log entry relates to an executed event corresponding to receipt of input data by the web application during the recorded session and comprises a timestamp indicating a time of occurrence during the recorded session and parameters relating to the executed event. Similar to the above recording method, the record-replay library component receives notification of events dispatched through the runtime environment so that it is able to identify a dispatched event corresponding to a creation of an object capable of receiving input data transmitted to the web application. Upon identification of such an event, the record-replay library component stores a reference to the object capable of receiving input data transmitted to the web application. If the record-replay library component subsequently identifies a log entry in the log file corresponding to the object relating to the stored reference, it generates an event comprising the parameters from the identified log entry and dispatches the event to the runtime environment on behalf of the object at a time based upon the timestamp, thereby simulating a corresponding event that occurred during the recorded session.

DETAILED DESCRIPTION

Figure 1:
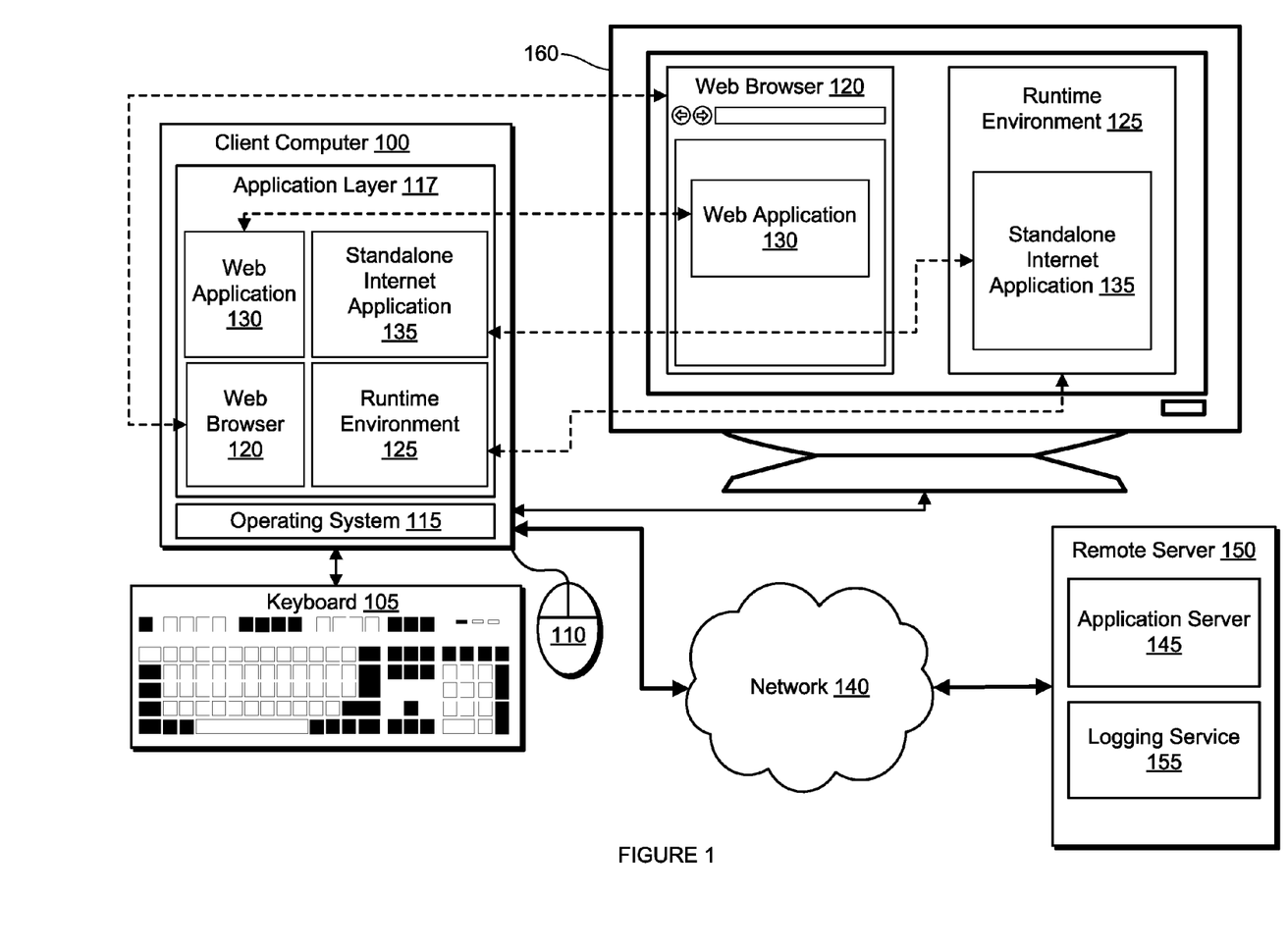
FIG. 1 depicts a block diagram of a web application environment.

FIG. 1 depicts a block diagram of a web application environment. On the user or client side, a client computer 100 is coupled to (or otherwise comprises) a keyboard 105 and mouse 110 or other similar input devices to capture user inputs. An operating system 115 of client computer 100 supports an application layer 117 that includes software programs such as a web browser 120 with embedded runtime environments for programming platforms such as Java, Flash and the like (e.g., installed via downloaded plug-ins and similar techniques, etc.) and standalone runtime environments such as runtime environment 125 for such programming platforms (e.g., Java Runtime Environment (JRE), Adobe Integrated Runtime (AIR), and the like). In one embodiment, a web application 130 is downloaded from a web site through web browser 120 and displayed as a web page within a runtime environment installed in the web browser. For example, a user may load a web page into web browser 120 whose uniform resource locator (URL) points to a .swf file (i.e., Flash player file). In this example, web application 130 is downloaded as the .swf file and displayed on a web page through the Flash runtime environment (also referred to as a Flash virtual machine or Flash player) that has been installed in web browser 120. Alternatively, standalone runtime environments such as runtime environment 125 can support a standalone Internet application 135 that runs outside the confines of web browser 120 but offers the same or similar functionalities as web application 130. In either case, displayed portions of web application 130 or standalone Internet application 135 (e.g., graphical user interfaces, etc.) are presented within web browser 120 or runtime environment 125, respectively, on a display 160 that is coupled to computer system 100.

Web application 130 communicates through a network 140, such as the Internet, with an application server 145 running on a remote server 150 and receives data and other content from application server 145 to provide to the user. As used herein, references to web application 130 will also apply to standalone Internet application 135, as the context requires, given their similarities. Additionally, in the embodiment of FIG. 1, a logging service 155 is provided by remote server 150. Logging service 155 receives and records log entries into a log file for replay purposes as directed by web application 130 and as further detailed herein. Such a logging service 155 may be provided as a service within application server 145 or as a service running independently within remote server 150 (as is depicted in FIG. 1). It should be further recognized that, in alternative embodiments, logging service 155 may be located elsewhere, including, for example, a different remote server or client computer 100 itself.

Figure 2:
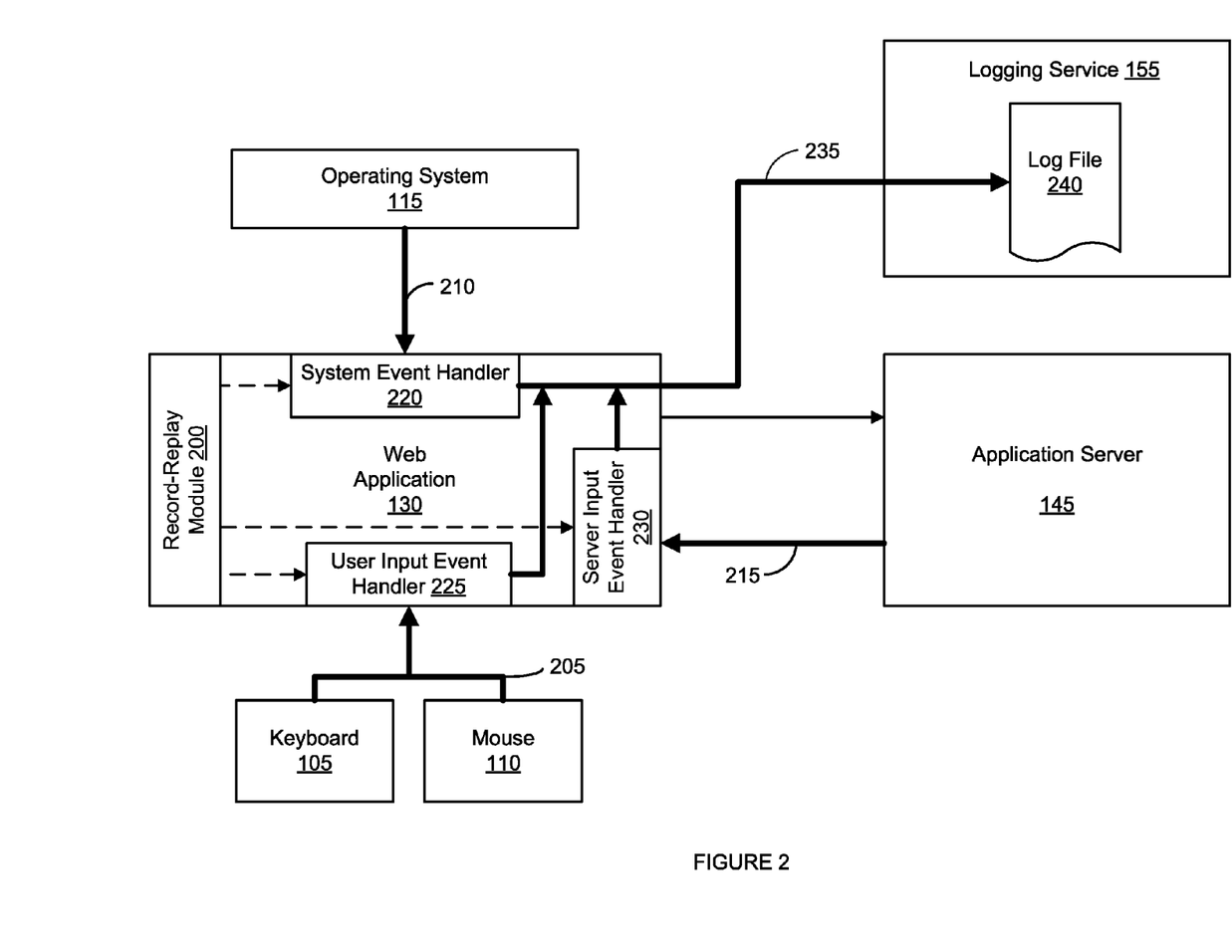
FIG. 2 depicts a block diagram of components of a web application and interaction of the components within the web application environment.

FIG. 2 depicts a block diagram of components of a web application and interaction of the components within the web application environment. Because many runtime environments in which the teachings herein may be utilized are based upon programming platforms that are, themselves, based on object-oriented programming paradigms (e.g., Java, ActionScript for Flash, etc.), the discussions herein may utilize object-oriented parlance to describe the interactions within web application 130. However, it should be recognized that despite the use of object-oriented parlance for description purposes herein, the functionality described for web application 130 may be written using procedural programming or any other programming language paradigm. Web application 130 comprises a record-replay module or library component (RR module) 200 that provides the capability to record the execution behavior of web application 130 into a log file for replay at a later point in time. In one embodiment, loading of web application 130 by its runtime environment causes an initialization of RR module 200 that results in a display of a record-replay administrative pop-up window or other user interface that enables a user to turn on as well as track and monitor record and replay capabilities. RR module 200 further provides the capability to intercept data relating to inputs into web application 130 from either the user (see arrow 205 from keyboard 105 and mouse 110), the operating system 115 (see arrow 210) or application server 145 on remote server 150 (see arrow 215). It should be recognized that while FIG. 2 depicts user inputs 205, operating system inputs 210 and server inputs 215 being transmitted directly to web application 130, such inputs may flow through operating system 115 (i.e., for user inputs 205 and server inputs 215) and the runtime environment prior to reaching web application 130 itself. In the embodiment of FIG. 2, RR module 200 attaches an event handler (see, e.g., system event handler 220, user input event handler 225, and server input handler 230) to each instantiated object of web application 130 that may generate an event indicative of a user input, system input or application server 145 input to web application 130 (such objects, hereinafter referred to as "input objects" and such events, hereinafter referred to as "input events"). For user inputs, such input objects may be, for example, GUI widgets. For system inputs, such input objects may be timer objects, alarm objects and the like. For application server 145 inputs, such input objects may be remote procedure call objects and the like. In one embodiment, such event handlers may be implemented as a callback routine of a listener object that is attached to a relevant input object and listens for events corresponding to such relevant input object. Upon being triggered or called, such event handlers, as depicted in FIG. 2, convert data associated with such events into a log entry that is transmitted (see arrow 235) to logging service 155 for storage in a log file 240 for subsequent replay purposes. For example, a user who clicks a mouse on a button displayed by web application 130 may trigger the runtime environment to generate an event for the corresponding button widget in web application 130 (e.g., a "mouse down" event). A user input handler such as user input handler 225 that has been attached to the button widget is notified and is then able to construct a log entry containing required information (i.e., for replay purposes) relating to the event for transmission to logging service 155 for storage in log file 240.

Figure 3:
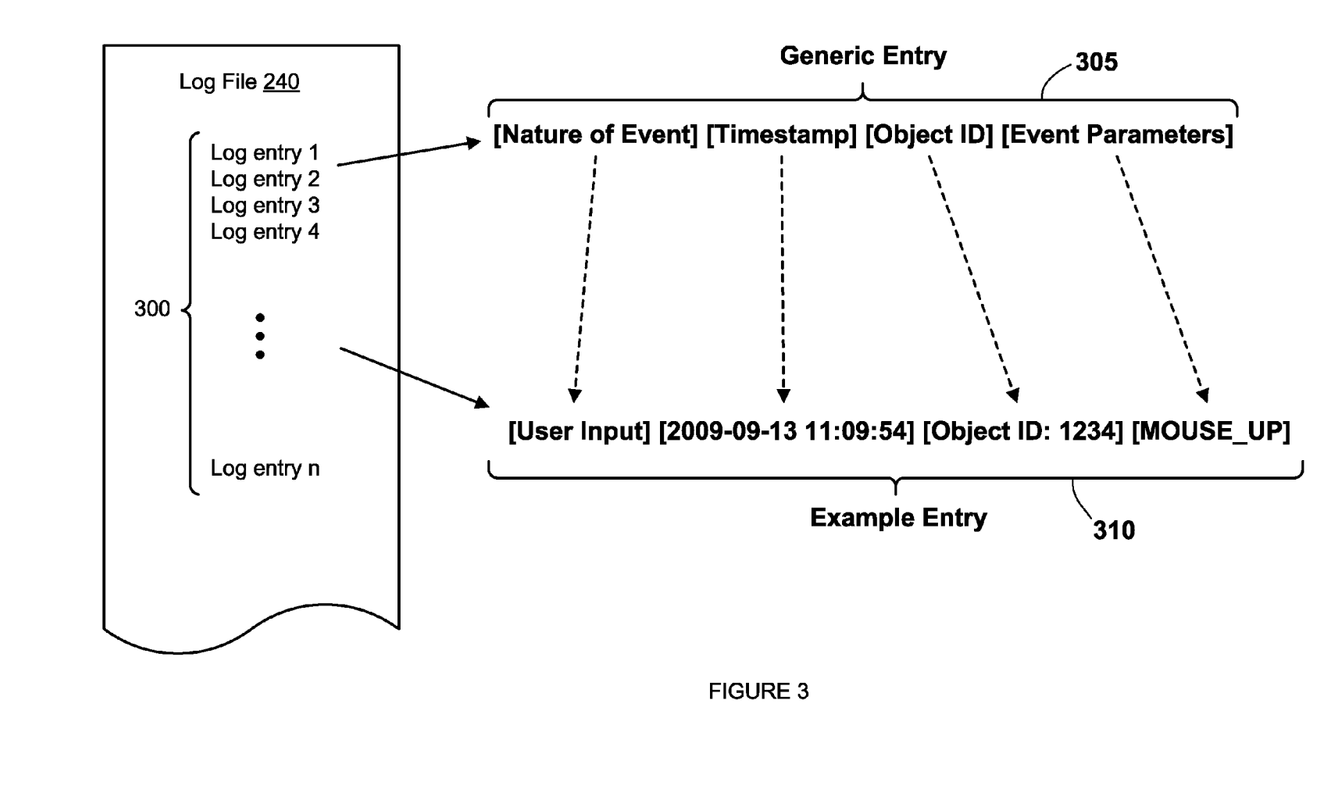
FIG. 3 depicts an exemplary structure of a log file.

FIG. 3 depicts an exemplary structure of a log file. As described in the context of FIG. 2, web application 130, via an event handler, generates and transmits a log entry for storage in log file 240 each time an input event is generated for an input object as a result of user input, system input or application server input. Once an event handler is notified of an input event, the event handler receives from the runtime environment the corresponding input object's identification (e.g., an ID number assigned to the input object by RR module 200 or the runtime environment) and any relevant parameters or data relating to the input event. For example, if the input object is a button widget, a relevant parameter for the input event may indicate whether the input event relates to a "mouse down" (i.e., depressing a mouse over a displayed button) or a "mouse up" event (i.e., releasing a depressed mouse on the displayed button). If the input object is a text field widget, a relevant parameter for the input event may be the current text string that has been input into the text field by a user. If the input object is a remote procedure call object, a relevant parameter may be the data payload transmitted to web application 130 by application server 145. The event handler further obtains a timestamp (e.g., a system time value) from the runtime environment to record the time when the event occurred and may generate further information to describe the nature of the event (e.g., whether it is a user input, system input or remote procedure call input, etc.). The event handler consolidates the foregoing information into a log entry and transmits it for storage in log file 240. FIG. 3 depicts the structure of log file 240 as a sequence of log entries 300 ordered according to their occurrence during an executed session of web application 130. It should be recognized that log file 240 may be implemented in a variety of ways, including, for example, as a text file of text entries, as a linked list of log entry objects, as an XML or binary encoded file, as part of a database, as a data structure stored (e.g., temporarily) in RAM memory, and the like. Generic log entry 305 depicts a standard template for a log entry according to the embodiment of FIG. 3. Such a log entry comprises: (a) a description of the nature of the event (e.g., whether the event is related to user input, system input or application server input), (b) a timestamp (e.g., the system time at which the event occurred or the amount of time that has elapsed since the occurrence of the immediately prior log entry's event, depending upon the embodiment), (c) the input object's identification number as assigned by RR module 200 or the runtime environment, and (d) any parameters relating to the actual event (e.g., mouse up, mouse down, payload data, etc.). Example log entry 310 depicts an example of a log entry for an event triggered by a user depressing a mouse over a displayed button that corresponds to button widget 1234, where 1234 is the identification number for the instantiated button widget as assigned by RR module 200 (or the runtime environment). It should be recognized that while the timestamp entry of example log entry 310 is depicted using a common timestamp format, such timestamps may reflect finer levels of time than just seconds (e.g., milliseconds, etc.).

Figure 4:
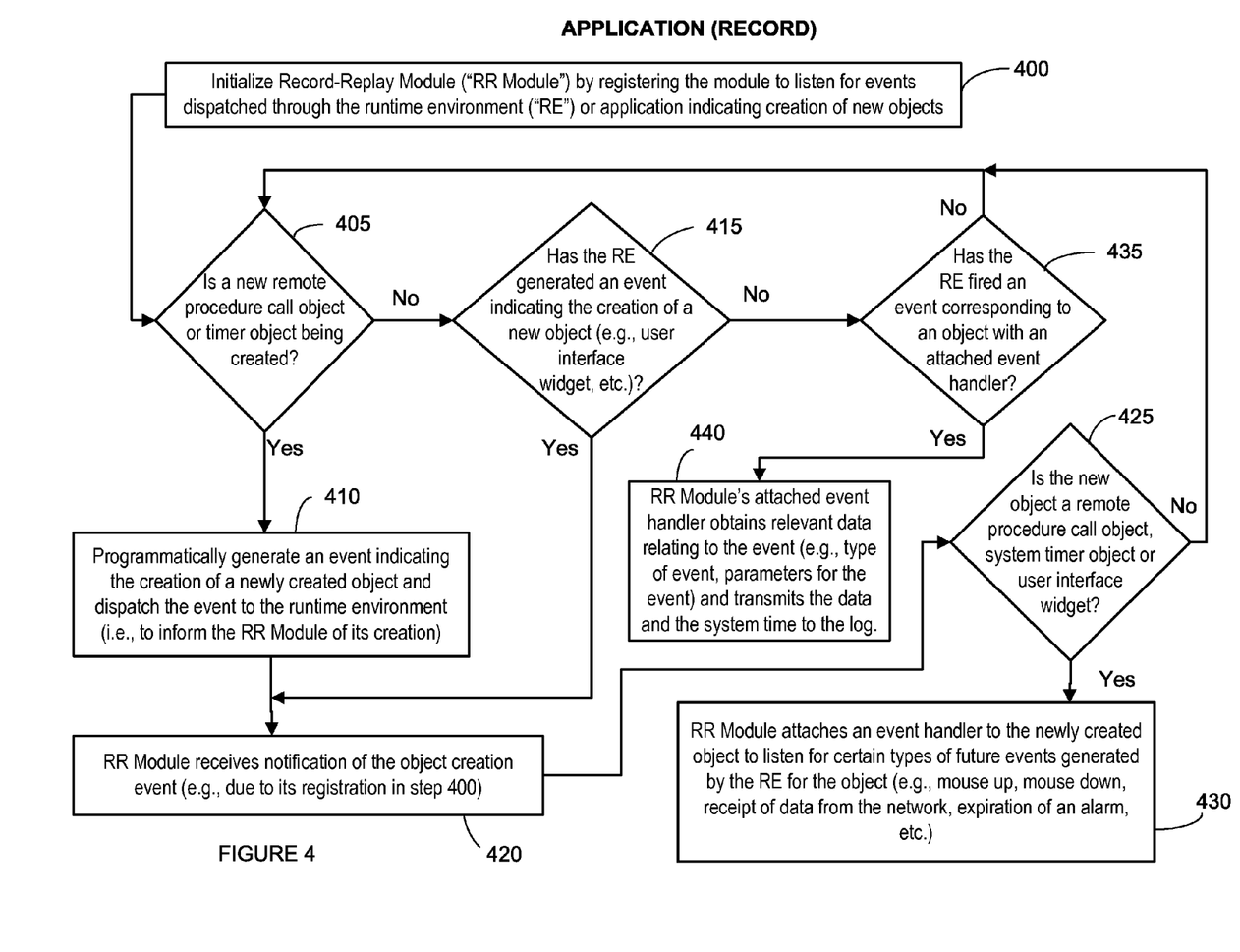
FIG. 4 depicts an exemplary flow chart for recording an executed session of a web application.

FIG. 4 depicts a flow chart for recording an executed session of a web application. In step 400, RR module 200 is initialized to listen for events dispatched through the runtime environment (or web application 130 itself) indicating creation of new objects. The initialization step may occur for example, when loading web application 130 into its runtime environment or when a user turns on a record option through a record-replay administrative user interface displayed by RR module 200 upon loading web application 130 into its runtime environment. In one embodiment, a timestamp indicating an initiation of recording may be obtained by RR module 200 and transmitted for storage in log file 240 to assist in determining when a first event corresponding to a first log entry should be executed during a replay session (e.g., by determining a time difference between the timestamp indicating the initiated recording session and the timestamp of the first log entry). As previously discussed in the context of FIG. 2, RR module 200 attaches an event handler to each input object of web application 130 that may generate an input event that requires recording. In order to attach an event handler to each such input object, RR module 200 needs to be apprised of when objects are generally created during execution of web application 200 and then assess whether such a newly created object is an input object that may subsequently generate input events that require recording. By listening for events dispatched through the runtime environment as in step 400, RR module 200 is generally notified of events, including those that may signal the creation of a new object, and is thereby able to attach an event handler to a newly created input object when needed.

If, during the execution of web application 130, a remote procedure call object or a system timer object (or any other relevant system object that may generate input into web application 130) is created in step 405, then in step 410, web application 130 generates an event indicating the creation of a newly created object and dispatches the event to the runtime environment. In one embodiment, during source code development for web application 130, a developer may expressly program web application 130 (i.e., insert source code) to dispatch such an event after instantiation of a remote procedure call object or system timer object (or any other input object requiring recording) such that RR module 200 is notified of such an object's creation or a recordable input event. In certain embodiments, the runtime environment may automatically generate such an event for certain types of input objects, obviating the need for step 410. For example, many runtime environments automatically generate an event indicating creation of a GUI widget, as depicted in decision step 415. In either case (i.e., automatic generation of an event in step 415 or programmatic generation of an event in step 410), in step 420, RR module 200 receives notification of the object creation event (e.g., due to its registration in step 400) and in step 425, if RR module 200 concludes that the newly created object is a remote procedure call object, system timer object, GUI widget or any other type of input object, then at step 430, RR module 200 attaches an event handler to the newly created object to listen for certain types of future events generated by the runtime environment for the object (e.g., mouse up, mouse down, receipt of data from the network, expiration of an alarm, etc.). In step 435, during execution of web application 130, if the runtime environment generates an input event for an object with an attached handler (i.e., an input object), then in step 440, the attached event handler obtains relevant information relating to the generated input event (e.g., as discussed in the context of FIG. 3), generates a log entry corresponding to the generated input event and transmits the log entry for storage in log file 240.

Figure 5:
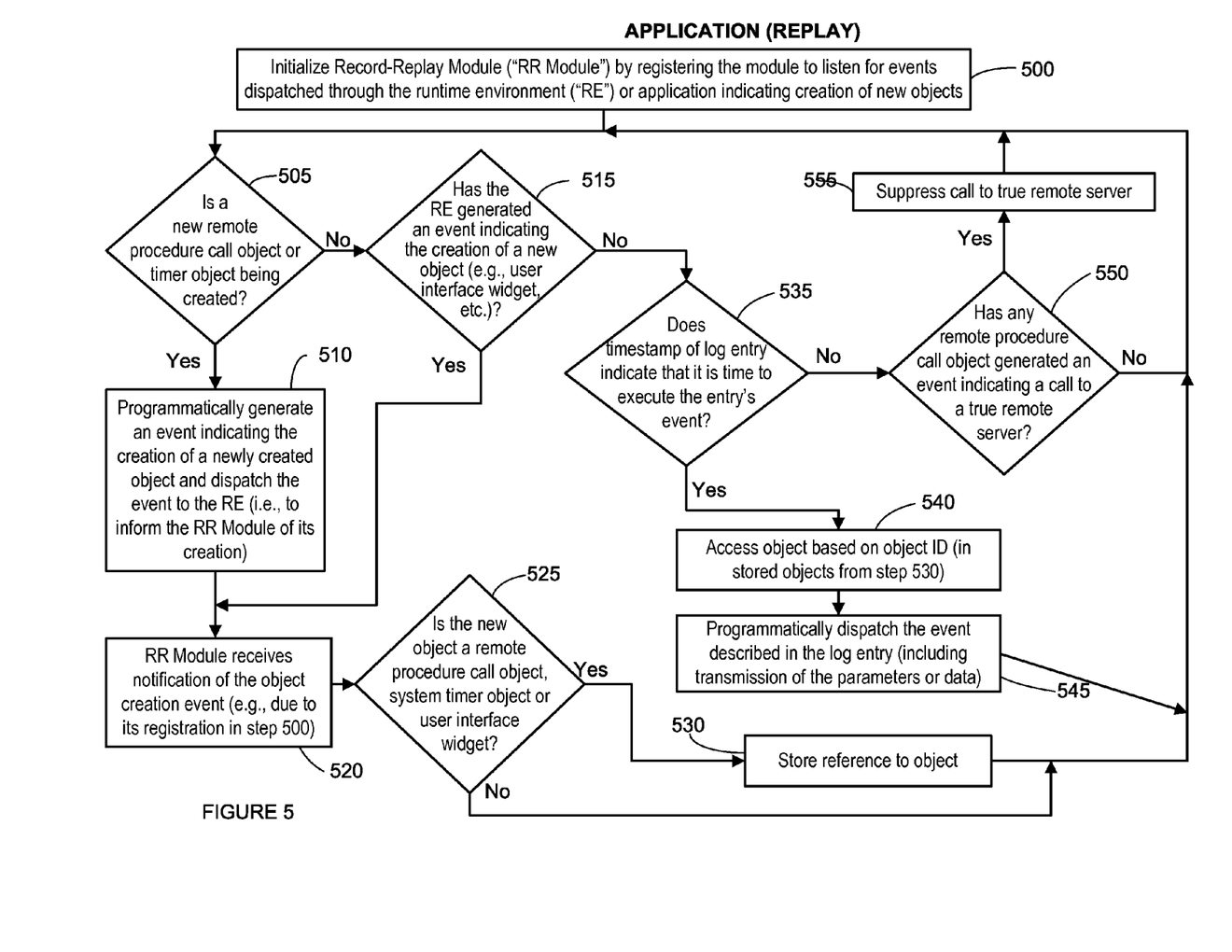
FIG. 5 depicts an exemplary flow chart for replaying an executed session of a web application.

FIG. 5 depicts a flow chart for replaying an executed session of a web application. Similar to the record session of FIG. 4, in step 500, RR module 200 is initialized to listen for events dispatched through the runtime environment (or web application 130 itself) indicating creation of new objects. The initialization step may occur for example, when loading web application 130 into its runtime environment or when a user turns on a replay option through a record-replay administrative user interface displayed by RR module 200 upon loading web application 130 into its runtime environment. If, during the execution of web application 130, a remote procedure call object or a system timer object (or any other input object) is created in step 505, then in step 510, web application 130 generates an event indicating the creation of a newly created object and dispatches the event to the runtime environment (similar to step 410 of FIG. 4). Alternatively, in step 515, the runtime environment may automatically generate an event indicating creation of an input object (e.g., a GUI widget) by web application 130. In either case (i.e., automatic generation of an event in step 515 or programmatic generation of an event in step 510), in step 520, RR module 200 receives notification of the object creation event (e.g., due to its registration in step 500) and in step 525, if RR module 200 concludes that the newly created object is a remote procedure call object, system timer object, GUI widget or any other type of input object, then RR module 200 stores a reference to the newly created object (e.g., stores a handle, pointer, address or any other type of link to the newly created input object) in step 530.

To replay a recorded session, RR module 200 is provided a corresponding log file (e.g., produced as a result of recording an executed session as described in the context of FIG. 4). In one embodiment, RR module 200 determines when a log entry in the log file should be executed during a replay session by computing the time differences between timestamps of consecutive log entries. When such a time difference has elapsed (e.g., as determined by a system alarm set by RR module 200, for example, in certain embodiments), RR module 200 injects the log entry's event into the replay session's execution stream. In alternative embodiments, the timestamp of a log entry may already indicate the elapsed time since the prior log entry's event (e.g., the time difference between log entry events was computed by RR module 200 as part of the log entry's creation during the record session). If, in step 535, the timestamp of the next log entry in the log file indicates that it is time to execute the log entry's event (e.g., by determining the difference between log entry's timestamp and its prior log entry's timestamp), then in step 540, RR module 200 obtains the log entry's stored object identification and locates the object by searching its stored objects from step 530. Once the object has been found in step 540, then in step 545, RR module 200 programmatically creates and dispatches an event through the identified object using the accompanying parameters and data stored in the log entry, thereby simulating the actual input event that had occurred during the recorded execution session. Furthermore, if, in step 550, a remote procedure call object or any other object generates an event for calling or outputting data to a remote server, RR module 200, in step 555, intercepts the event and suppresses the event to prevent transmission of messages to the remote server and prevent potential errors resulting from failure to successfully transmit, such as timeouts, for example, because the remote server is not available or otherwise responsive to such a transmission). Specifically, since remote server responses are being simulated through the log entry files, transmission of messages to remote servers are unnecessary and may cause state confusion for the remote servers themselves.

It should be recognized that various modifications and changes may be made to the specific embodiments described herein without departing from the broader spirit and scope of the invention as set forth in the appended claims. For example, while the foregoing description has discussed embodiments using web applications or Internet applications, it should be recognized that any network utilizing application can leverage the techniques disclosed herein. For example, embodiments may provide a variety of modes for replaying a recorded executed session. In addition to replaying the log file in accordance with the timestamps stored in the log entries, embodiments may also enable replay in compressed or expanded time. For example, a compressed time replay mode may enable the events of the log entries in a log file to be replayed in their original order, but reduce the time between such events by a factor between 0 and 1 (e.g., reducing the time between events to 0 effectively removes all possible delays such that the web application is processing the data as quickly as it possibly can). An expanded time replay mode may increase the time between log entry events, for example, to give the replay a slow-motion quality that may be useful for debugging and demonstration purposes. Another replay mode may enable each log entry's event to be replayed one at a time as manually controlled by a user (e.g., via the record-replay administrative user interface). Yet another mode may enable a combination of the foregoing, for example, enabling replay to occur in compressed or expanded time until a pre-determined point and then switch to a user controlled replay. Another mode may enable the replay of certain types of events only. For example, log entries relating to user and system input events may be replayed but other log entries relating, for example, to application server input events may be ignored. Such a replay mode enables the web application to communicate with a real application server and receive input from the real application server during replay.

The various embodiments described herein may employ various computer-implemented operations involving data stored in computer systems. For example, these operations may require physical manipulation of physical quantities. Usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for recording a session of a web application running within a runtime environment executed by a computing device, the method comprising the steps of:

receiving, by the web application, notification of events dispatched through the runtime environment;

identifying a dispatched event corresponding to a creation of an object that receives input data transmitted to the web application;

attaching an event handler to the object to receive events generated for the object when the event handler is executed by the computing device;

receiving notification of an event generated for the object that corresponds to receipt of input data to the web application;

generating, by the event handler executed by the computing device, a log entry for the event, the log entry including a timestamp indicating a time of occurrence of the event, actions performed to initiate a request for the event to be executed, and an identification of the input received; and transmitting, by the event handler, the log entry to a log file for storage.

2. The method of claim 1, wherein each of the steps is performed by a library component of the web application designed to provide record and replay capabilities for the web application.

3. The method of claim 2, further comprising the step of triggering the runtime environment to dispatch the identified dispatched event corresponding to the creation of the object.

4. The method of claim 3, wherein the triggering step occurs as a result of inserting an event dispatch function call into the source code of the web application, wherein the event dispatch function call is inserted into the source code of the web application at a location separate from the library component of the web application.

5. The method of claim 3, wherein the object is one of objects for performing remote procedure calls to communicate with a remote server and objects for performing system timer events within a computer system upon which the web application runs.

6. The method of claim 2, wherein the log entry further comprises an identification number assigned to the object.

7. The method of claim 1, wherein the web application is a Flash application and the runtime environment is one of a Flash virtual machine running within a web browser or Adobe Integrated Runtime (AIR).

8. The method of claim 1, wherein the input data is selected from the group consisting of user input, computer system input and remote server input.

9. A method for replaying a recorded session of a web application running within a runtime environment executed on a computing device, the method comprising the steps of:

loading a log file comprising a sequence of log entries generated by the web application executed by the computing device, wherein each log entry relates to an executed event corresponding to receipt of input data by the web application during the recorded session, actions performed to initiate a request for the event to be executed, and a timestamp indicating a time of occurrence during the recorded session and parameters relating to the executed event;

receiving notification of events dispatched through the runtime environment;

identifying a dispatched event corresponding to a creation of an object that receives input data transmitted to the web application;

storing a reference to the object capable of receiving input data transmitted to the web application;

identifying, by the web application executed by the computing device, a log entry in the log file corresponding to the object relating to the stored reference;

generating an event corresponding the parameters from the identified log entry; and dispatching, by the web application executed by the computing device, the event to the runtime environment on behalf of the object at a time based upon the timestamp, thereby simulating a corresponding event that occurred during the recorded session.

10. The method of claim 9, wherein each of the steps is performed by a library component of the web application designed to provide record and replay capabilities for the web application.

11. The method of claim 10, further comprising the step of triggering the runtime environment to dispatch the identified dispatched event corresponding to the creation of the object.

12. The method of claim 11, wherein the triggering step occurs as a result of inserting an event dispatch function call into the source code of the web application, wherein the event dispatch function call is inserted into the source code of the web application at a location separate from the library component of the web application.

13. The method of claim 11, wherein the object is one of objects for performing remote procedure calls to communicate with a remote server and objects for performing system timer events within a computer system upon which the web application runs.

14. The method of claim 10, wherein each log entry further comprises an identification number assigned during the recorded session to an object corresponding to the executed event and the step of identifying the log entry comprises comparing the identification number in the log entry to an identification number of the object relating to the stored reference that is assigned to the object.

15. The method of claim 9, wherein the object is a graphics user interface (GUI) widget for interacting with a user.

16. The method of claim 9, wherein the web application is a Flash application and the runtime environment is one of a Flash virtual machine running within a web browser or Adobe Integrated Runtime (AIR).

17. The method of claim 9, wherein the input data is generated from one of user input, computer system input and remote server input.

18. A computer-readable non-transitory storage medium including instructions that, when executed as a web application running within a runtime environment on a computer processor, causes the computer processor to execute instructions for recording a session of the web application by performing the steps of:

receiving by the web application executed by the computer processor, notification of events dispatched through the runtime environment;

identifying a dispatched event corresponding to a creation of an object that receives input data transmitted to the web application;

attaching an event handler to the object to receive events generated for the object;

receiving notification of an event generated for the object that corresponds to receipt of input data to the web application;

generating, by the event handler executed by the computer processor, a log entry for the event, the log entry including a timestamp indicating a time of occurrence of the event, actions performed to initiate a request for the event to be executed, and an identification of the input received; and transmitting, by the event handler, the log entry to a log file for storage.

19. The computer-readable non-transitory storage medium of claim 18, further including instructions that, when executed as a web application running within a runtime environment on a computer processor, further causes the processor to replay a recorded session of the web application by performing the steps of:

loading a log file comprising a sequence of log entries, wherein each log entry relates to an executed event corresponding to receipt of input data by the web application during the recorded session, actions performed to initiate a request for the event to be executed, and a timestamp indicating a time of occurrence during the recorded session and parameters relating to the executed event;

receiving notification of events dispatched through the runtime environment;

identifying a dispatched event corresponding to a creation of an object that receives input data transmitted to the web application;

storing a reference to the object capable of receiving input data transmitted to the web application;

identifying a log entry in the log file corresponding to the object relating to the stored reference;

generating an event comprising the parameters from the identified log entry; and dispatching the event to the runtime environment on behalf of the object at a time based upon the timestamp, thereby simulating a corresponding event that occurred during the recorded session.

20. The method of claim 1, wherein the actions performed to initiate a request for the event to be executed correspond to one or more of the following: user input; system input; and remote server input.

* * * * *